P. B. LINDFORS.
ADJUSTABLE TOOL HOLDER FOR MILLING MACHINES.
APPLICATION FILED JULY 16, 1917.

1,249,642.

Patented Dec. 11, 1917.
2 SHEETS—SHEET 1.

Witness
Chas. W. Stauffiger
Karl H. Butler

Inventor
Paul B. Lindfors,
By Barthel & Barthel
Attorneys

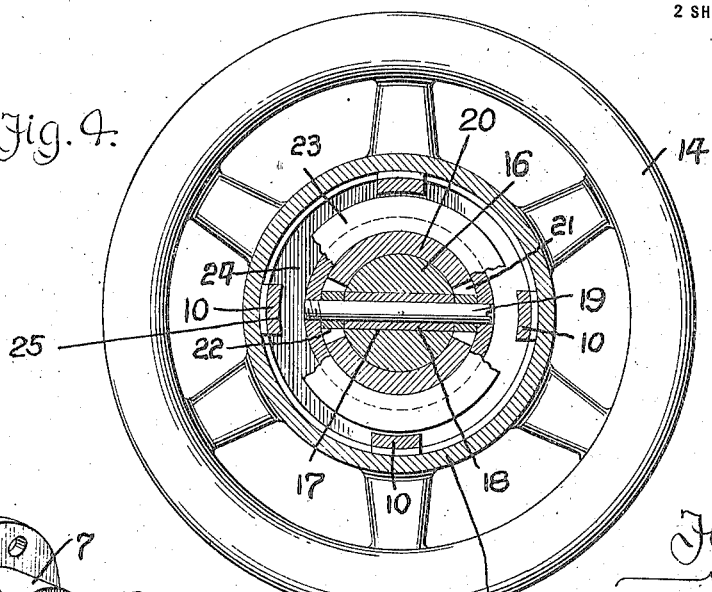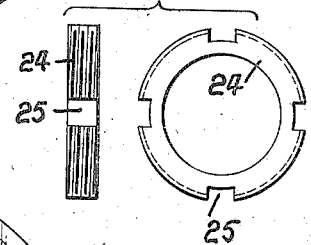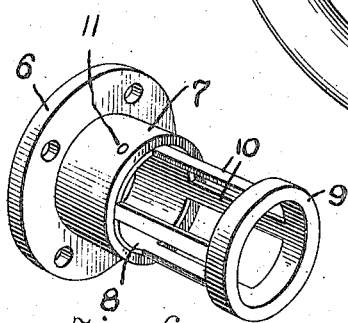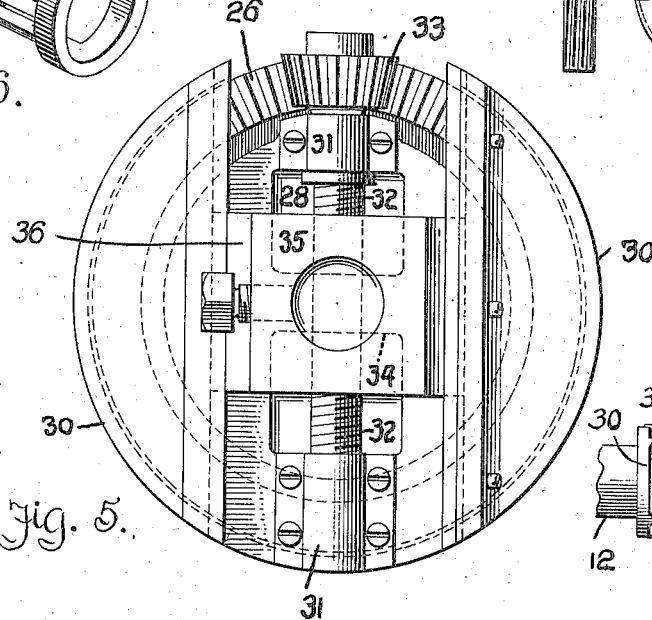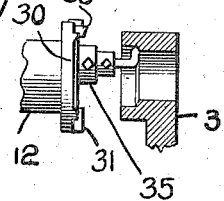

UNITED STATES PATENT OFFICE.

PAUL B. LINDFORS, OF DETROIT, MICHIGAN.

ADJUSTABLE TOOL-HOLDER FOR MILLING-MACHINES.

1,249,642. Specification of Letters Patent. Patented Dec. 11, 1917.

Application filed July 16, 1917. Serial No. 180,703.

*To all whom it may concern:*

Be it known that I, PAUL B. LINDFORS, a citizen of Russia, residing at Detroit, in the county of Wayne and State of Michigan, have invented certain new and useful Improvements in Adjustable Tool-Holders for Milling-Machines, of which the following is a specification, reference being had therein to the accompanying drawings.

This invention relates to an adjustable tool holder for milling machines, lathes, and such machines in connection with which it may be necessary or desirable to adjust tools during the operation of the machine.

My invention aims to provide positive and reliable means, in a manner as hereinafter set forth, for minutely and accurately adjusting a tool, while the same is in operation, said means being in the form of a novel holder that may be easily and quickly installed and safely used.

My invention further aims to provide an adjustable tool holder wherein the parts are constructed with a view of reducing the cost of manufacture and at the same time retain those features by which durability and ease of adjusting and assembling the parts are secured. With such ends in view, my invention resides in the novel construction, combination and arrangement of parts to be hereinafter specifically described and then claimed.

Reference will now be had to the drawings, wherein—

Fig. 4 is a cross sectional view taken on the line IV—IV of Fig. 1;

Fig. 5 is an end view of the tool holder;

Fig. 6 is a perspective view of a detached guide;

Fig. 7 shows views of a detached nut; and

Fig. 8 is a side elevation of a portion of the tool holder relative to a piece of work.

Figures 2, 3:
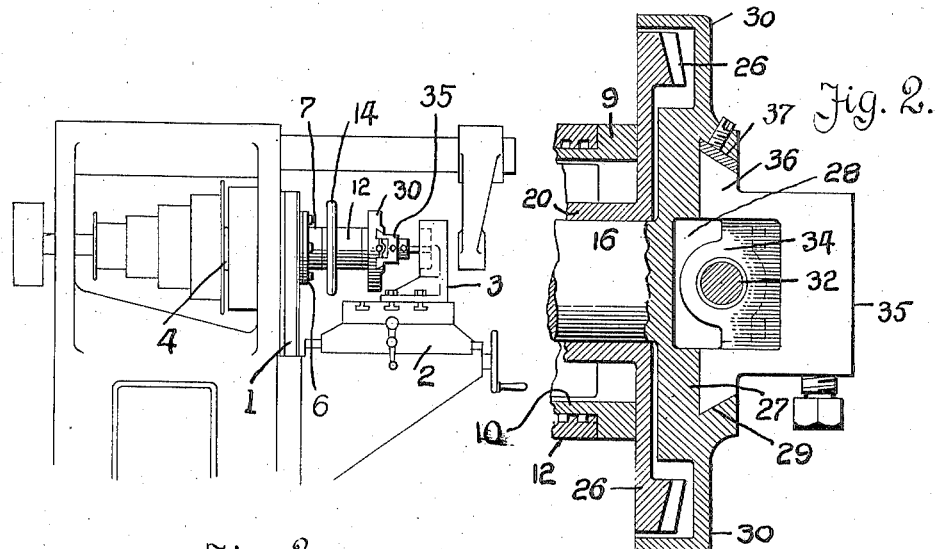
Fig. 2 is a horizontal sectional view of a portion of the same, partly in plan.
Fig. 3 is a side elevation of the tool holder in connection with a portion of a milling machine.

As illustrating an instance of the location and use of the adjustable tool holder, there is shown in Fig. 3 a portion of a milling machine including a bearing 1, an adjustable table 2 for a piece of work 3 and a driven spindle 4.

Figure 1:
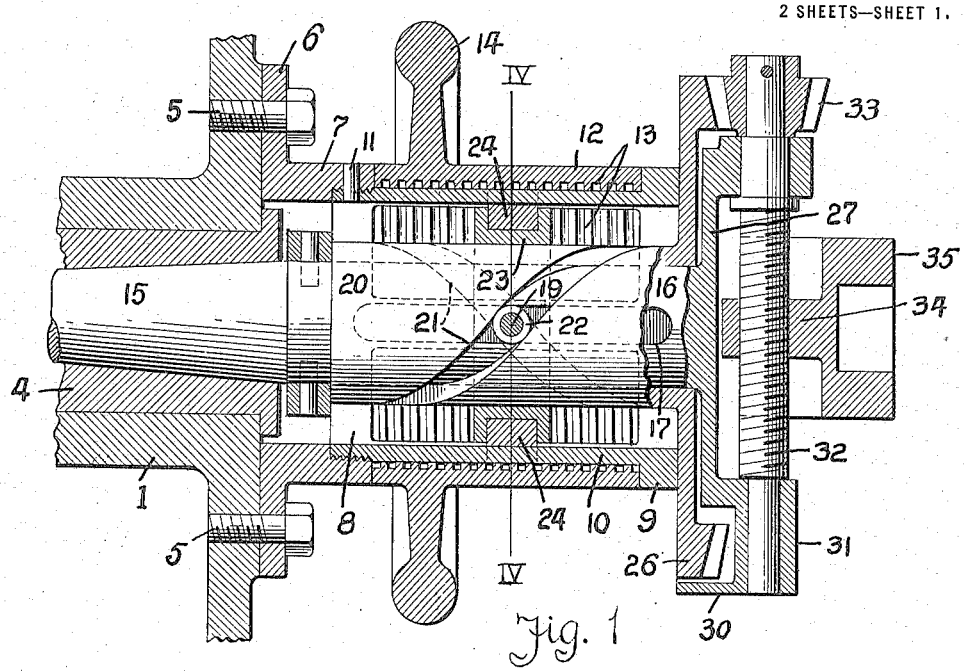
Figure 1 is a longitudinal sectional view of the tool holder.

Attached to the face of the bearing 1, by screw bolts 5 or other fastening means, is a flange 6 of a cylindrical socket 7 and the outer end of said socket is interiorly screwthreaded to receive the inner end of a guide, best shown in Figs. 1 and 6. The guide comprises rings 8 and 9 connected by a plurality of arms 10. The ring 8 is exteriorly screwthreaded so that it may be mounted in the outer end of the socket 7 and a pin 11 is employed, as shown in Fig. 1, to prevent accidental rotation of the guide relative to the socket. The ring 9 is of the same diameter as the socket 7 and coöperates with said socket in holding a rotatable sleeve 12 on or about the arms 10. The sleeve 12 is interiorly screwthreaded, as at 13, and on the inner end of said sleeve is a hand wheel 14 to facilitate rotating said sleeve. The outer end of the sleeve and the ring 9 may be graduated or provided with a micrometer scale so that adjustment of the sleeve 12 relative to the ring 9 of the guide may be easily and quickly made.

Extending into the spindle 4 of the milling machine is the tang 15 of a stem 16, said stem having a longitudinal slot 17 for a revoluble anti-frictional roller 18 on a pin 19.

Rotatable on the stem 16 is a hub 20 having opposed spiral slots 21 through which the pin 19 extends and is provided with anti-frictional rollers 22 within the spiral slots. The ends of the pin 19 are mounted in a collar 23 slidable on the hub 20 and said collar has a peripheral groove for a nut 24. The nut 24 is notched, as at 25, to provide clearance for the arms 10 of the guide, said arms preventing rotation of the nut 24 but not interfering with the longitudinal movement thereof by reason of its screwthreaded engagement with the sleeve 12. The outer end of the hub 20 is provided with a circular rack 26 abutting the ring 9 of the guide.

The outer end of the stem 16 has a circular head 27 and the outer face of said head provided with a central groove 28 in communication with a dovetailed groove 29. The circular head 27 is also provided with opposed guards 30 inclosing portions of the circular rack 26.

On the outer face of the circular head 27 are alining bearings 31 for a rotatable and non-reciprocable screw 32, which has one end thereof provided with a pinion 33 meshing with the circular rack 26, as best shown in Figs. 1 and 5. The screw 32 is in screw-threaded engagement with the nut portion 34 of a tool socket or holder 35 and this socket or holder has a dove tailed portion 36 slidable in the groove 29 of the head 27. An adjustable shim or liner 37 is placed in the groove 29 to compensate for wear between the head 27 and the dove-tailed portion 36 of the tool socket or holder 35.

From the foregoing it will be noted that the stem 16 and the hub 20 can freely revolve and consequently the tool carried by the socket 35 can operate upon the piece of work 3. During the rotation of the tool carried by the socket 35, the hand wheel 14 can be turned and such movement will reciprocate the collar 23 on the hub 20, causing the hub 20 to be partially rotated, either clockwise or counterclockwise relative to the stem 16, by reason of the pin 19 and rollers 22 extending into the spiral slot 21 of the hub 20. Partial rotation of the hub 20 means partial rotation of the screw 32, since the rack 26 meshes with the pinion 33 on the screw. As the socket 35 is guided in the head 27, the screw 32 will shift said socket longitudinally of the screw. Such movemens means that the tool carried by the socket 35 can be gradually shifted into engagement with a piece of work, for instance as shown in Fig. 8, and by following the micrometer scale on the sleeve 12 and the ring 9, it is possible to minutely advance the tool with precision.

It is thought that the operation and utility of my invention will be apparent without further description, and while in the drawings there is illustrated a preferred embodiment of the invention, it is to be understood that the structural elements are susceptible to such changes in size, shape and manner of assemblage as fall within the scope of the appended claims.

What I claim is:—

1. In an adjustable tool holder, a socket, a guide carried by said socket, a rotatable sleeve on said guide, a drive stem centrally of said sleeve, a hub on said stem, a nut loose on said hub actuated by said sleeve adapted to rotate said hub, a screw at the outer end of said stem, a tool socket adapted to be adjusted by said screw, and means actuated by said hub imparting movement to said screw.

2. In an adjustable tool holder, a guide adapted for attachment to a milling machine, a rotatable sleeve on said guide, a driven stem centrally of said sleeve, a rotatable and non-reciprocable screw carried by the outer end of said stem, a tool socket adapted to be adjusted by said screw, and a hub on said stem actuated by said sleeve and adapted for rotating said screw.

3. In an adjustable tool holder, a guide adapted for attachment to a milling machine, a rotatable sleeve on said guide, a driven stem centrally of said sleeve, a head carried by the outer end of said stem, a rotatable and non-reciprocable screw carried by said head, a tool socket slidable in said head and adapted to be adjusted by said screw, and a hub on said stem actuated by said sleeve and adapted for rotating said screw.

4. In an adjustable tool holder, a stationary guide, a sleeve thereon, a driven stem extending through said guide, a rotatable and non-reciprocable screw at the outer end of said stem, a tool socket adapted to be adjusted by said screw, a hub on said stem adapted for rotating said screw and a collar loose on said hub actuated by rotation of said sleeve adapted for imparting movement to said hub.

5. In an adjustable tool holder, a guide, a rotatable sleeve on said guide, a driven stem extending through said guide, a head carried by the outer end of said stem, a rotatable and non-reciprocable screw carried by said head, a tool socket slidable in said head and adapted to be adjusted by said screw, a hub rotatable on said stem adapted for rotating said screw, a collar reciprocable on said hub adapted for rotating said hub, and a nut carried by said collar in engagement with said sleeve and adapted to reciprocate said collar when said sleeve is rotated.

6. In an adjustable tool holder, a socket, a guide carried thereby, a rotatable sleeve on said guide, a driven stem extending through said guide, a head on the outer end of said stem, a tool socket slidable in said head, a hub on said stem, a rack and pinion actuated by said hub for adjusting said tool socket, and means interposed between said hub and said sleeve actuated by said sleeve adapted for imparting movement to said hub.

7. In an adjustable tool holder, a stationary guide, a rotatable sleeve thereon, a driven stem extending through said guide, an adjustable tool socket at the outer end of said stem, a hub on said stem, means actuated by said hub for adjusting said tool socket, and means interposed between said hub and said sleeve and actuated by said sleeve for imparting movement to said hub.

8. The combination with a milling machine, of a socket carried thereby, a guide fixed in said socket, an interiorly screw-threaded sleeve rotatable on said guide, a driven stem extending through said guide, a head carried by the outer end thereof, a tool socket slidable in said head, a spirally grooved hub on said stem, a collar reciprocable on said hub, means including a rack and pinion actuated by said hub adapted for adjusting said tool socket, a collar reciprocable on said hub, a pin carried by said collar and extending into the spiral groove of said hub, and a nut in said collar in screwthreaded engagement with said sleeve adapted for reciprocating said collar when said sleeve is rotated.

In testimony whereof I affix my signature in the presence of two witnesse.

PAUL B. LINDFORS.

Witnesses:
KARL H. BUTLER,
ANNA M. DORR.